US005519213A

United States Patent [19]

Hatakeyama

[11] Patent Number: 5,519,213

[45] Date of Patent: May 21, 1996

[54] FAST ATOM BEAM SOURCE

[75] Inventor: Masahiro Hatakeyama, Kanagawa, Japan

[73] Assignee: Ebara Corporation, Tokyo, Japan

[21] Appl. No.: 289,662

[22] Filed: Aug. 12, 1994

[30] Foreign Application Priority Data

Aug. 20, 1993 [JP] Japan .................................... 5-227993
Aug. 20, 1993 [JP] Japan .................................... 5-227994

[51] Int. Cl.[6] ................................ H01S 1/00; H01S 3/00; H05H 3/02

[52] U.S. Cl. ................................................................ 210/251

[58] Field of Search ............................................... 250/251

[56] References Cited

U.S. PATENT DOCUMENTS

| | | | |
|---|---|---|---|
| 5,055,672 | 10/1991 | Nagai | 250/251 |
| 5,216,241 | 6/1993 | Hatakeyama et al. | 250/251 |
| 5,221,841 | 6/1993 | Nagai et al. | 250/251 |
| 5,243,189 | 9/1993 | Nagai et al. | 250/251 |

FOREIGN PATENT DOCUMENTS

| | | |
|---|---|---|
| 0251567 | 1/1988 | European Pat. Off. . |
| 0531949 | 3/1993 | European Pat. Off. . |

OTHER PUBLICATIONS

Shimokawa et al., "Reactive–fast–atom beam etching of GaAs using $Cl_2$ gas", *J. Appl. Phys.* 66(6), Sep. 15, 1989, pp. 2613–2618.

Hatakeyama, "A FAB Source for SIMS", Hyomen–Kagaku (Surface Science), vol. 10, No. 1, 1989, pp. 29–33.

Patent Abstracts of Japan, vol. 9, No. 270 (E353) Oct. 26, 1985.

Shimokawa et al., "A Low–Energy Fast–Atom Source", *Nuclear Instruments & Methods in Physics Research,* vol. B33, No. 1–4, Jun. 1988, pp. 867–870.

Carruth, Jr. et al., "Method for determination of neutral atomic oxygen flux", *Review of Scientific Instruments,* vol. 61, No. 4, Apr. 1990, pp. 1211–1216.

*Primary Examiner*—Bruce C. Anderson
*Attorney, Agent, or Firm*—Wenderoth, Lind & Ponack

[57] ABSTRACT

A fast atom beam source is capable of efficiently emitting a fast atom beam with low energy and high particle flux. A plate-shaped electrode has a plurality of atom emitting holes. A pair of electrodes are disposed in series opposite the plate-shaped electrode so as to form an electric discharge part. An AC power supply impresses an AC voltage between the pair of electrodes. A DC power supply impresses a DC voltage between the plate-shaped electrode and one of the pair of electrodes that is closer to the plate-shaped electrode. A gas inlet introduces a gas to induce electric discharge in the space between the plate-shaped electrode and the pair of electrodes.

10 Claims, 6 Drawing Sheets

FAST ATOM BEAM SOURCE

BACKGROUND OF THE INVENTION

The present invention relates to a fast atom beam source which is capable of emitting a fast atom beam efficiently at a relatively low discharge voltage.

Atoms and molecules have a thermal motion in the atmosphere at room temperature with a kinetic energy of about 0.05 eV. "Fast atoms" are atoms and molecules that have a kinetic energy much larger than 0.05 eV, and when such particles are emitted in one direction, they are called a "fast atom beam".

FIG. 5 shows one example of the structure of a fast atom beam source that emits argon atoms with a kinetic energy of 0.5 to 10 keV, among conventional fast atom beam sources designed to generate fast beams of gas atoms. In the figure, reference numeral 1 denotes a cylindrical cathode, 2 a doughnut-shaped anode, 3 a DC high-voltage power supply (0.5 to 10 kV), 4 a gas nozzle, 5 argon gas, 6 plasma, 7 fast atom emitting holes, and 8 a fast atom beam. The operation of the conventional fast atom beam source is as follows:

The constituent elements, exclusive of the DC high-voltage power supply 3 and a discharge stabilizing resistor (not shown), are incorporated in a vacuum container (not shown). After the vacuum container has been sufficiently evacuated, argon gas 5 is injected into the cylindrical cathode 1 from the gas nozzle 4. Meanwhile, a DC voltage is impressed between the anode 2 and the cathode 1 from the DC high-voltage power supply 3 in such a manner that the anode 2 has a positive potential, and the cathode 1 a negative potential. Consequently, electric discharge occurs between the cathode 1 and the anode 2 to generate plasma 6, thus producing argon ions and electrons. During this process, electrons that are emitted from one end face of the cylindrical cathode 1 are accelerated toward the anode 2 and pass through the central hole in the anode 2 to reach the other end face of the cathode 1. The electrons reaching the second end face lose their speed. Then, the electrons are turned around and are accelerated toward the anode 2 to pass again through the central hole of the anode 2 before reaching the first end face of the cathode 1. Such repeated motion of electrons forms a high-frequency vibration between the two end faces of the cylindrical cathode 1 across the anode 2, and while undergoing the repeated motion, the electrons collide with the argon gas to produce a large number of argon ions.

The argon ions produced in this way are accelerated toward each end face of the cylindrical cathode 1 to obtain a sufficiently large kinetic energy. The kinetic energy obtained at this time is, for example, about 1 keV when the discharge sustaining voltage impressed between the anode 2 and the cathode 1 is 1 kV. There is a turn point of electrons vibrating at high frequency in the vicinity of each end face la of the cylindrical cathode 1. This point is a space where a large number of electrons with low energy are present. Argon ions change to argon atoms in this space by colliding and recombining with the electrons. In the collision between the ions and the electrons, since the mass of the electrons is so much smaller than that of the argon ions that their mass can be ignored, the argon ions deliver the kinetic energy to the atoms without substantial loss, thus forming fast atoms. Accordingly, the kinetic energy of the fast atoms is about 1 keV. The fast atoms accelerated are emitted in the form of a fast atom beam 8 to the outside through the emitting holes 7 provided in one end face 1*a* of the cylindrical cathode 1.

The above-described conventional fast atom beam source suffers, however, from some problems described below. To increase the rate of emission of the fast atom beam, the prior art needs to raise the discharge voltage, or use a magnet jointly with the described arrangement, or increase the pressure of the gas introduced and cannot adopt any other method that does not result in an increase in the energy of the fast atom beam, or an increase in the overall size of the apparatus, or an extension in the energy band of the fast atom beam, etc. Thus, the prior art presents many problems and difficulties during use.

SUMMARY OF THE INVENTION

In view of the above-described circumstances, it is an object of the present invention to provide a fast atom beam source which is capable of efficiently emitting a fast atom beam with low energy and high particle flux.

To attain the above-described object, the present invention provides a fast atom beam source which includes a plate-shaped electrode having a plurality of atom emitting holes, and a pair of electrodes which are disposed in series opposite the plate-shaped electrode so as to form an electric discharge part. The fast atom beam source further includes a power supply for impressing an AC voltage between the pair of electrodes, and another power supply for applying a DC voltage between the plate-shaped electrode and one of the pair of electrodes that is closer to the plate-shaped electrode. In addition, the fast atom beam source has a gas inlet for introducing a gas to induce electric discharge in the space between the plate-shaped electrode and the pair of electrodes. The plate-shaped electrode may be integrated with one of the pair of electrodes that form an electric discharge part.

In operation, an AC voltage is impressed between the pair of electrodes to induce electric discharge and ionize the gas, thereby creating large quantities of ions and electrons and maintaining the electric discharge at low voltage. Thus, it is possible to emit a fast atom beam with low energy.

If a magnetic field is additionally provided in the electric discharge part, the discharge voltage can be further lowered, and high-density plasma can be generated.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DESCRIPTION OF THE PREFERRED EMBODIMENTS

Embodiments of the present invention will be described below in detail with reference to the accompanying drawings.

Figure 1:
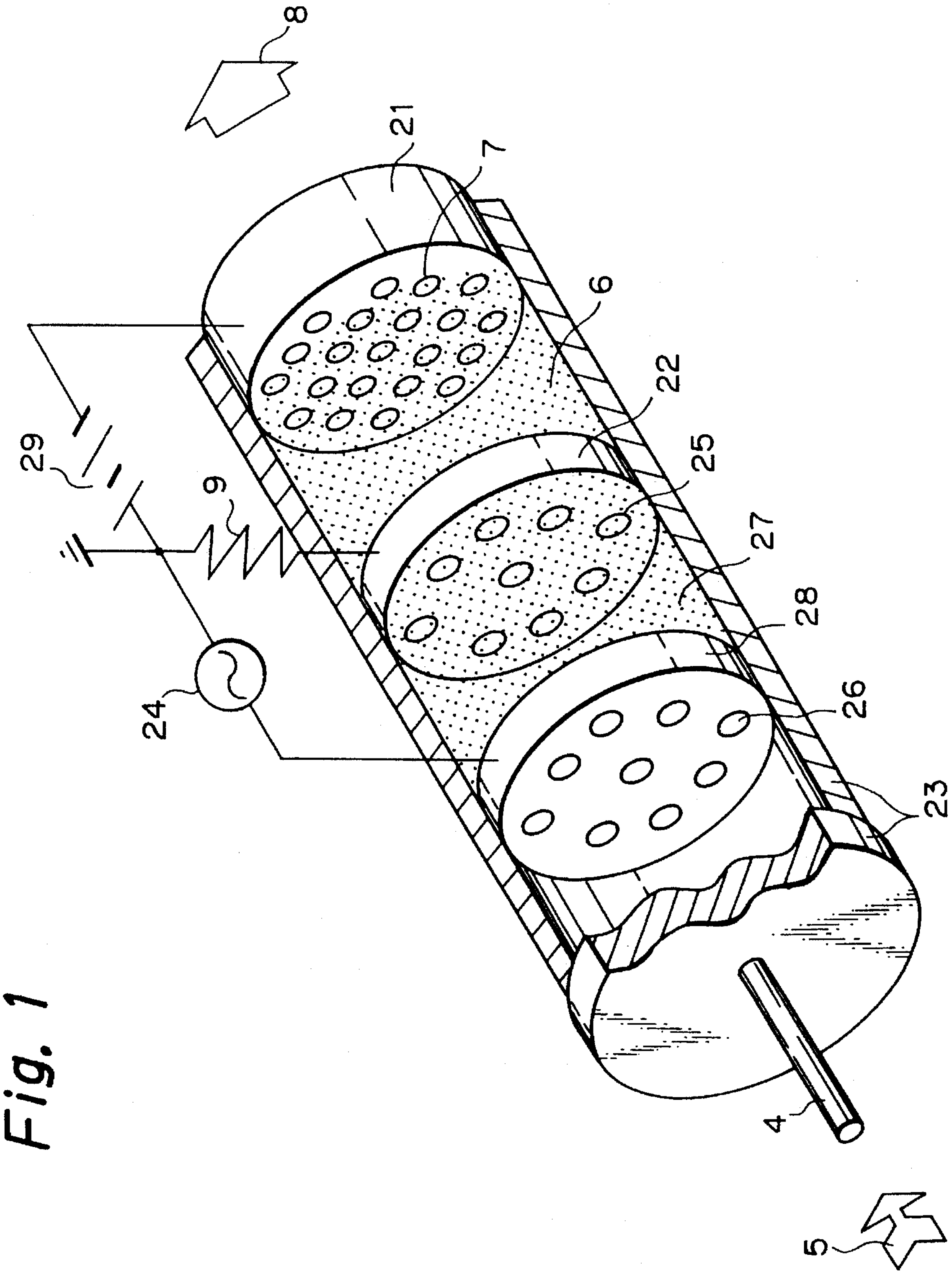
FIG. 1 is a broken-away perspective view of a first embodiment of the fast atom beam source according to the present invention.
Figure 5:
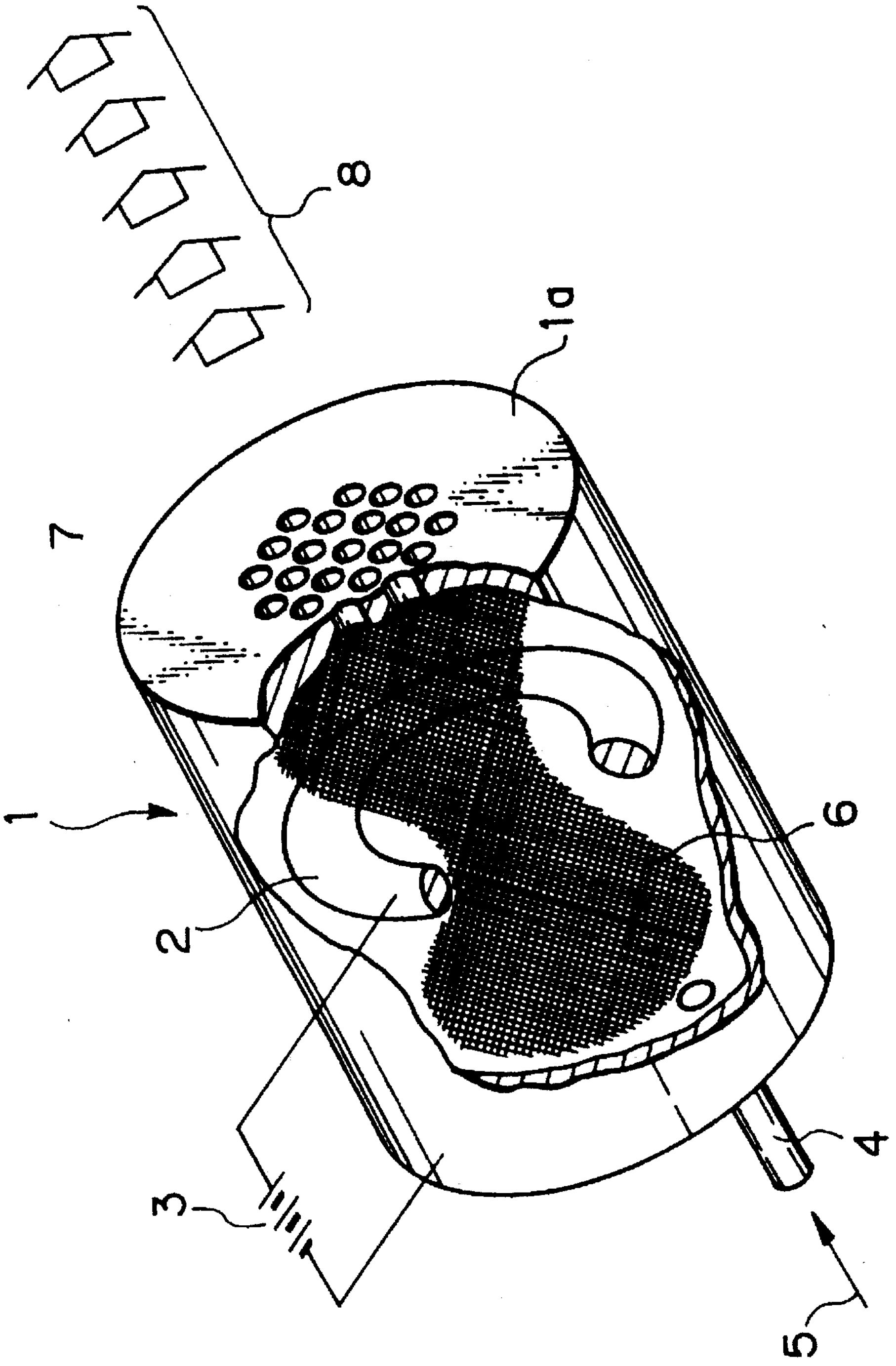
Fig. 5 PRIOR ART
FIG. 5 is a broken-away perspective view of a conventional fast atom beam source.

FIG. 1 illustrates the structure of a first embodiment of the fast atom beam source according to the present invention. In the figure, constituent elements having the same functions as those of the prior art shown in FIG. 5 are denoted by the same reference numerals, and a detailed description thereof is omitted. Referring to FIG. 1, a plate-shaped electrode 21 has fast atom emitting holes 7. A pair of plate-shaped electrodes 22 and 28 form an electric discharge part of the source when an AC voltage is impressed therebetween. The plate-shaped electrodes 22 and 28 have communicating holes 25 and 26, respectively, for passing gas 5 or the gas 5 which is in a plasmatic state. A high-frequency power supply 24 (e.g., 13.56 MHz) is connected between the electrodes 22 and 28. In addition, a DC power supply 29 is connected between the electrodes 21 and 22 so that the electrode 21 serves as a cathode, and the electrode 22 as an anode, thereby forming a DC discharge part between the two electrodes 21 and 22. A stabilizing resistor 9 is provided for stabilizing an electric discharge state. The plate-shaped electrodes 21, 22 and 28 are placed in a fast atom beam source casing 23.

When a voltage is impressed between the electrodes 22 and 28 from the power supply 24, a high-frequency electric field is produced, and the electrons of the gas 5 move in response to the change of the high-frequency electric field, but the gas ions cannot move in response to the change of the high-frequency electric field because of their relatively large mass. The utilization of this phenomenon makes it possible to raise the electron temperature and generate high-density plasma 27 by the high-frequency electric field.

The fast atom beam source in this embodiment operates as follows. The constituent elements of the fast atom beam source, exclusive of the high-frequency power supply 24 and the DC power supply 29, are accommodated in a vacuum container (not shown). After the vacuum container has been sufficiently evacuated, gas 5, for example, argon, is introduced into the fast atom beam source casing 23 through the gas nozzle 4. A high-frequency voltage is impressed between the electrodes 22 and 28, which constitute an electric discharge part, by the high-frequency power supply 24. Thus, high-density plasma 27 is formed at a low voltage. The high-density plasma 27 flows with the stream of the gas 5, and it is introduced into the DC discharge part formed between the electrodes 21 and 22 through the communicating holes 25, thereby enabling DC electric discharge to be induced at a low voltage. As a result, high-density plasma 6 is generated in the space between the electrodes 21 and 22, and gas ions and electrons are produced in the high-density plasma 6. The ions are accelerated toward the cathode 21 and thus acquire a large amount of kinetic energy, and the ions lose their electric charges by colliding with the remaining gas particles in the cathode 21 or by recombining with the electrons, thereby being converted into fast atoms. The fast atoms are emitted in the form of a fast atom beam 8 to the outside the fast atom emitting holes 7.

Figure 2:
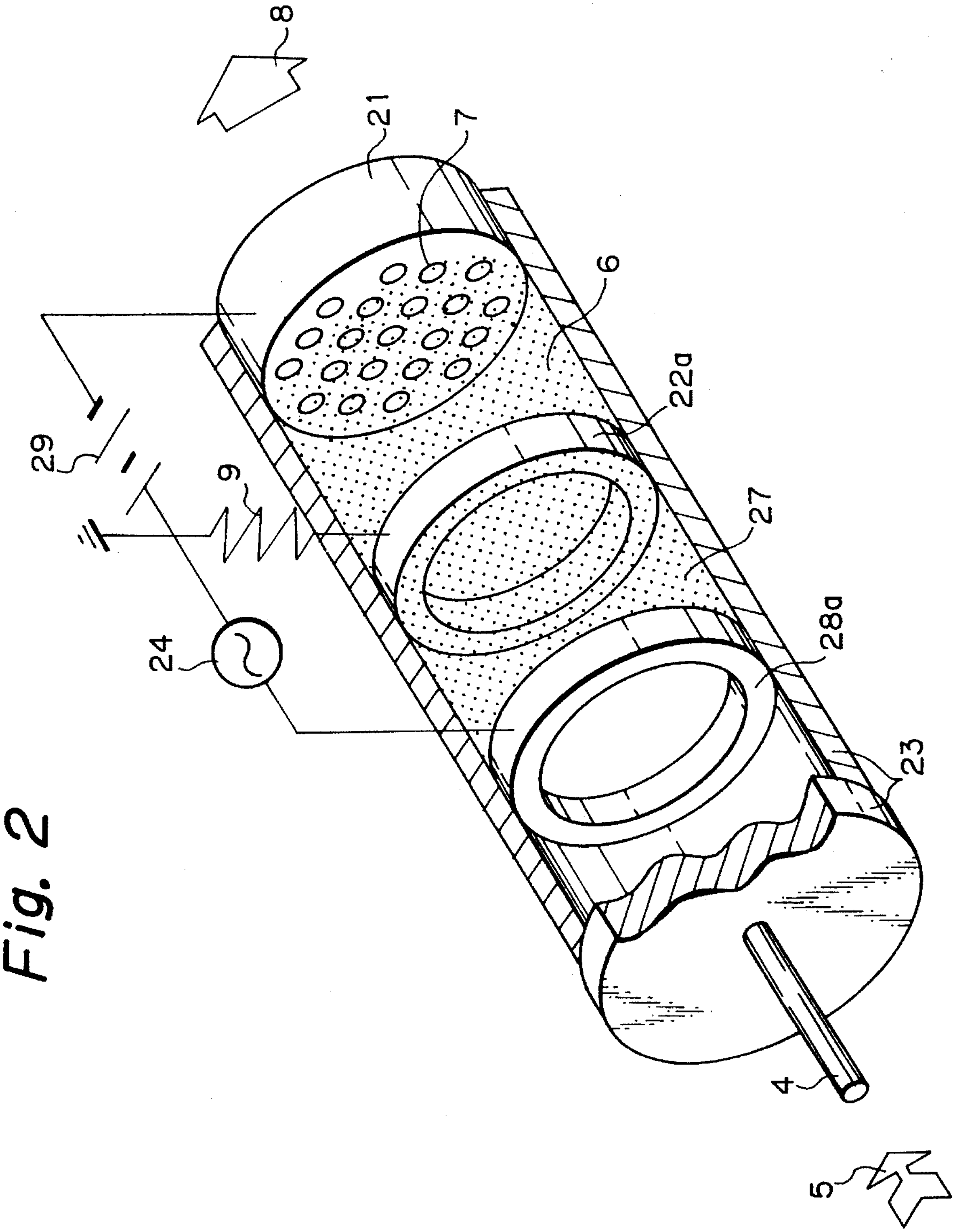
FIG. 2 is a similar view of a second embodiment of the fast atom beam source according to the present invention.

FIG. 2 illustrates a second embodiment of the fast atom beam source according to the present invention. The second embodiment differs from the first embodiment in that the two electrodes that form the AC discharge part are not plate-shaped electrodes but ring-shaped electrodes **22*a* and 28*a***. The other constituent elements are the same as those in the first embodiment. Therefore, the same or corresponding constituent elements are denoted by the same reference numerals as those in the first embodiment, and a detailed description thereof is omitted.

The above-described ring-shaped electrodes **22*a* and 28*a* also enable the gas 5 to be brought into a plasmatic state 27 at a low voltage by impressing a high-frequency voltage between the two electrodes 22*a* and 28*a*. The plasma 27 is supplied to the DC discharge part defined between the electrodes 21 and 22*a*, where high-density plasma 6 is formed at a low voltage, and a fast atom beam 8 is emitted through the fast atom emitting holes 7. Accordingly, it is possible to obtain a fast atom beam 8** with low energy in the same way as in the first embodiment.

Thus, the two electrodes that form a high-frequency electric field may be either plate-shaped electrodes 22 and 28 as in the first embodiment or ring-shaped electrodes **22*a* and 28*a* as in the second embodiment. It is also possible to use a plate-shaped electrode as one of the two electrodes that form the high-frequency electric field and a ring-shaped electrode as the other electrode. In addition, the electrode structure is not necessarily limited to a ring shape or a plate shape. Any type of electrode structure may be employed as long as it allows the gas 5** or plasma to pass therethrough.

Figure 3:
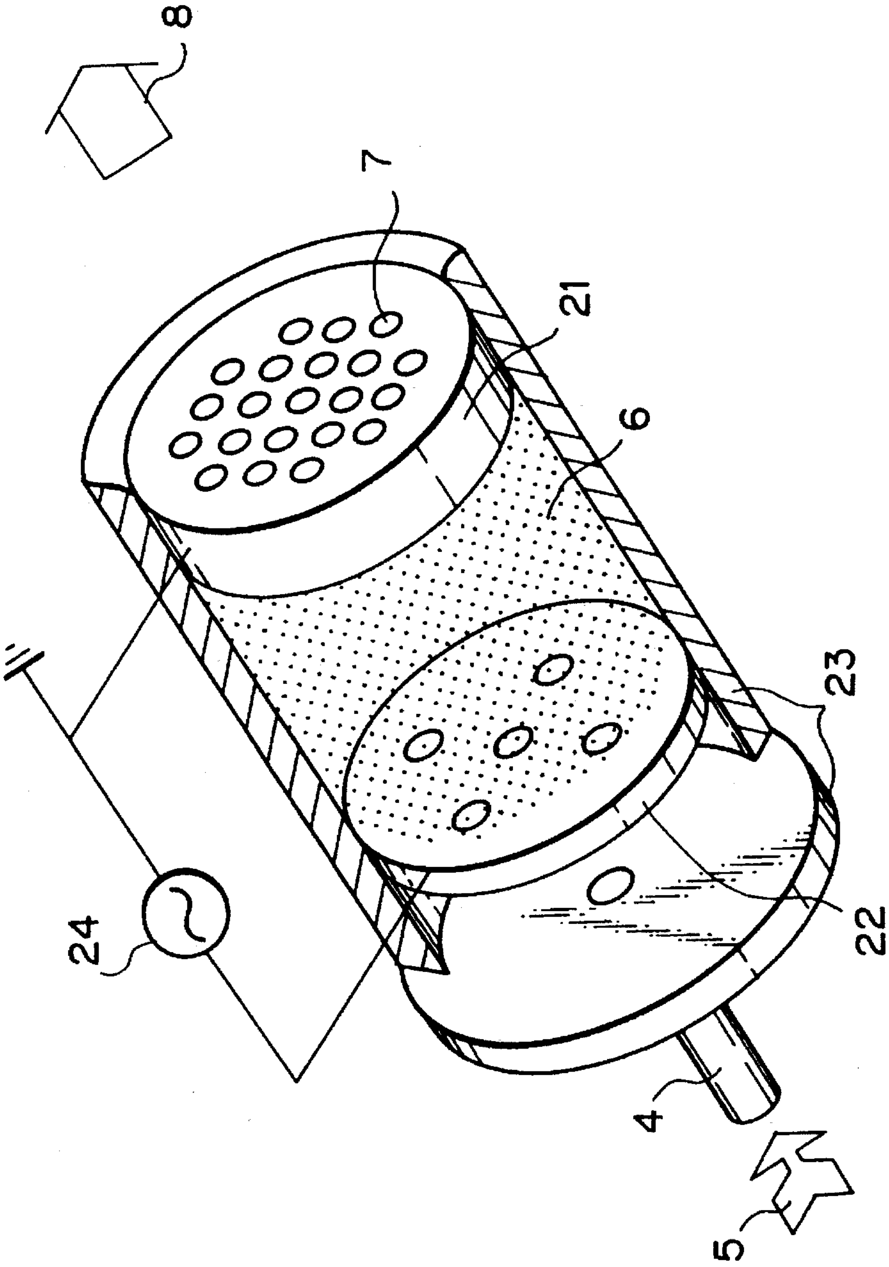
FIG. 3 is a similar view of a third embodiment of the fast atom beam source according to the present invention.

FIG. 3 illustrates the structure of a third embodiment of the fast atom beam source according to the present invention. In the figure, constituent elements having the same functions as those of the prior art shown in FIG. 5 are denoted by the same reference numerals, and a detailed description thereof is omitted. In FIG. 3, reference numeral 21 denotes a plate-shaped cathode, 22 a plate-shaped anode, and 24 a high-frequency power supply (e.g., 13.56 MHz). The high-frequency power supply 24 applies a high-frequency voltage between the electrodes 21 and 22, thereby attaining electric discharge at a low voltage.

When a high-frequency electric field is produced, electrons move in response to the change of the high-frequency electric field, but ions cannot move in response to the change of the high-frequency electric field because of their relatively large mass. The utilization of this phenomenon makes it possible to raise the electron temperature and generate high-density plasma at a low voltage.

The operation of the third embodiment is as follows. The constituent elements of the fast atom beam source, exclusive of the high-frequency power supply 24, are accommodated in a vacuum container (not shown). After the vacuum container has been sufficiently evacuated, gas 5, for example, argon, is introduced. A high-frequency voltage is impressed between the electrodes 21 and 22, which constitute an electric discharge part, by the high-frequency power supply 24. Thus, high-density plasma is formed at a low voltage. Gas ions and electrons are produced in the high-density plasma. The ions are accelerated toward the cathode 21 so that the ions acquire a large amount of kinetic energy, and the ions lose their electric charges by colliding with the remaining gas particles in the cathode 21 or by recombining with the electrons, thereby being converted into fast atoms. The fast atoms are emitted in the form of a fast atom beam 8 to the outside from the fast atom emitting holes 7.

Figure 4:
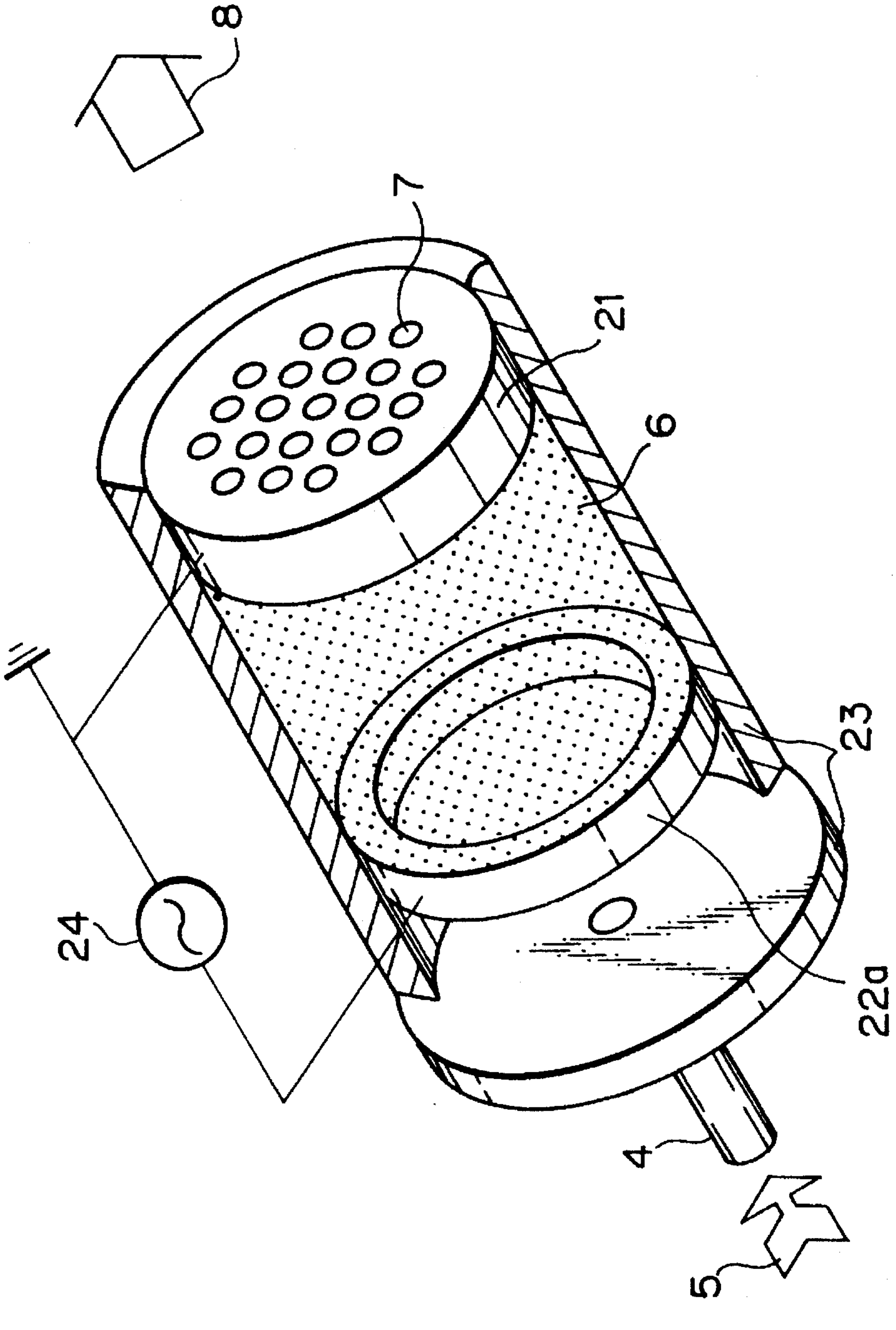
FIG. 4 is a similar view of a fourth embodiment of the fast atom beam source according to the present invention.

FIG. 4 illustrates a fourth embodiment of the fast atom beam source according to the present invention. This embodiment differs from the third embodiment in that the anode **22*a*** is not a plate-shaped electrode but a ring-shaped electrode. The other constituent elements are the same as in the third embodiment. Therefore, the same or constituent elements are denoted by the same reference numerals as those in the third embodiment, and a detailed description thereof is omitted.

As has been described above, electric discharge induced in the gas 5 is readily maintained even at a low voltage by the high-frequency voltage impressed between the electrodes 21 and 22*a*, whereby a fast atom beam 8 with low energy can be obtained in the same way as described above.

It should be noted that high-density plasma can be similarly formed in the space between the two electrodes not only by electric discharge induced by a high-frequency voltage as in the foregoing embodiments but also by a pulsed voltage or a low-frequency AC voltage. By impressing an AC voltage across the electric discharge part, the ions and electrons remaining in the space between the electrodes are accelerated by the repeatedly applied voltage and collide with the gas and the electrodes. Thus, the secondary electron emission is enhanced, and the discharge voltage can be lowered.

Figure 6B:
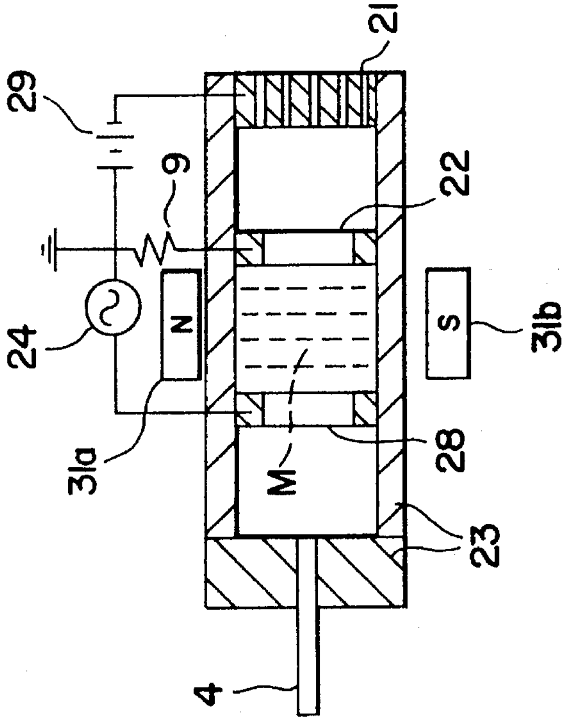
FIGS. 6A and 6B are schematic diagrams, in section, of fast atom beam sources in which examples of magnetic field producing elements are incorporated into the embodiment of FIG. 2.
Figure 6A:
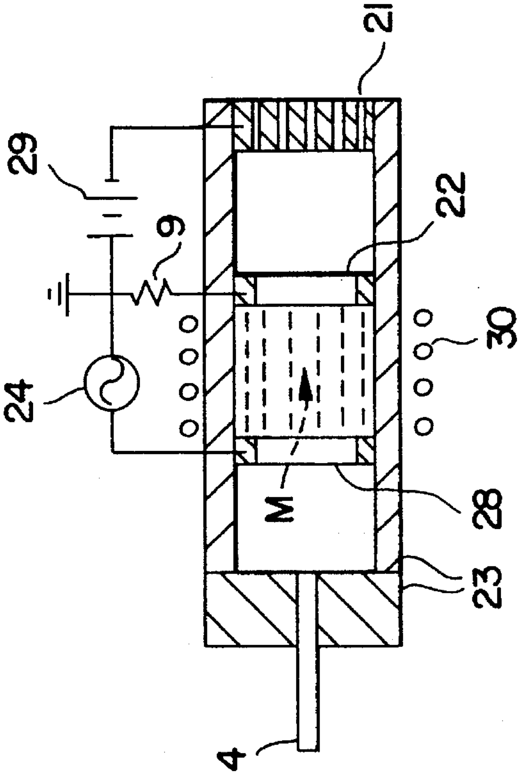

If a magnetic field is provided, it is possible to further facilitate the lowering of the discharge voltage and the formation of high-density plasma. A longitudinal magnetic field has magnetic lines of force lying perpendicularly to the electrode surfaces in the embodiments shown in FIGS. 1 to 4. The longitudinal magnetic field M can be formed, for example, by energizing a coil 30 wound around the fast atom beam (see FIG. 6A in which the coil is applied to the embodiment of FIG. 2, for example). In the case of a lateral magnetic field M, magnetic lines of force lie parallel to the electrode surfaces. The lateral magnetic field can be formed, for example, by arranging N- and S-pole permanent magnets 31*a* and 31*b* to face each other across the fast atom beam source casing 23 (see FIG. 6B). In the case of a multi-pole magnetic field, magnetic fields are produced around imaginary bars which are assumed to be present around the outer periphery of the electric discharge part.

Any of the longitudinal, lateral and multi-pole magnetic fields enhances the motion of the electrons and ions in the electric discharge part (between the electrodes) and increases the number of times the ions collide with the gas, thereby making it possible to further lower the discharge voltage and generate high-density plasma.

The fast atom beam source that uses an AC voltage according to the present invention makes it possible to lower the discharge voltage and emit a fast atom beam with low energy in comparison to the conventional fast atom beam source that uses only a DC voltage. In addition, it is possible to minimize the disturbance and gas impurities in the electric discharge part in comparison to thermal electron emission caused by using a filament, for example.

A particle beam with low energy can fabricate the surface of a solid or modify it without causing serious damage to the solid material when colliding therewith, and it can be advantageously utilized for the-fine pattern processing of semiconductors, analytical purposes, etc. In particular, since the fast atom beam is electrically neutral, it can be applied not only to metals and semiconductors but also to insulators such as plastics, ceramics, etc., to which the ion beam technique cannot effectively be applied.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A fast atom beam source comprising: a plate-shaped accelerating cathode having a plurality of emitting holes extending therethrough, a discharge cathode and a discharge anode, which are disposed in series at predetermined distances, respectively, from said accelerating cathode to collectively form an electric discharge part, and a gas inlet through which a gas is to be introduced into said electric discharge part, so that the gas will be ionized to generate plasma by electric discharge induced between said discharge cathode and discharge anode, thereby producing gas ions and electrons, and that the ions are accelerated and recombined with the electrons into fast atoms, the fast atoms being emitted from the emitting holes of said accelerating cathode, and an AC power supply connected between said discharge cathode and said discharge anode, which form the electric discharge part, to impress an AC voltage across said discharge cathode and said discharge anode thereby promoting the ionization of the gas to generate plasma.

2. A fast atom beam source according to claim 1, wherein each of said discharge cathode and said discharge anode is one of a ring-shaped electrode and a plate-shaped electrode having a plurality of communicating holes extending therethrough.

3. A fast atom beam source according to claim 1, and further comprising magnetic field generating means for generating a magnetic field in said electric discharge part to enhance motion of the electrons and ions, thereby promoting the ionization of the gas to generate plasma.

4. A fast atom beam source according to claim 1, wherein said AC power supply is a high-frequency power supply for producing a high-frequency electric field, said high-frequency electric field having a frequency at which the gas electrons can move in response to a change of the electric field, but the gas ions cannot move in response to a change of the electric field.

5. A fast atom beam source according to claim 4, wherein said AC power supply produces an electric field of a frequency of about 13.56 MHz.

6. A fast atom beam source comprising: a plate-shaped accelerating cathode having a plurality of emitting holes extending therethrough, an anode disposed at a predetermined distance from said cathode, and a gas inlet through which a gas is to be introduced into a space between said cathode and anode, so that the gas will be ionized to generate plasma by electric discharge induced between said cathode and anode, thereby producing gas ions and electrons, and that the ions are accelerated and recombined with the electrons into fast atoms, the fast atoms being emitted from the emitting holes of said cathode, and an AC power supply connected between said cathode and anode, to impress an AC voltage between said cathode and said anode thereby promoting the ionization of the gas to generate plasma.

7. A fast atom beam source according to claim 6, wherein said anode is one of a plate-shaped electrode having a plurality of communicating holes extending therethrough and a ring-shaped electrode.

8. A fast atom beam source according to claim 6, and further comprising magnetic field generating means for generating a magnetic field in said electric discharge part to enhance motion of the electrons and ions, thereby promoting the ionization of the gas to generate plasma.

9. A fast atom bean source according to claim 6, wherein said AC power supply is a high-frequency power supply producing a high-frequency electric field, said high-frequency electric field having a frequency at which the gas electrons can move in response to a change of the electric field, but the gas ions cannot move in response to a change of the electric field.

10. A fast atom beam source according to claim 9, wherein said AC power supply produces an electric field of a frequency of about 13.56 MHz.

* * * * *